United States Patent [19]

Geerlings

[11] Patent Number: 5,034,823
[45] Date of Patent: Jul. 23, 1991

[54] DROP-OUT COMPENSATION CIRCUIT

[75] Inventor: Jurgen H. T. Geerlings, Eindhoven, Netherlands

[73] Assignee: U.S. Philips Corporation, New York, N.Y.

[21] Appl. No.: 333,486

[22] Filed: Apr. 5, 1989

[30] Foreign Application Priority Data

May 9, 1988 [NL] Netherlands .......... 8801206

[51] Int. Cl.⁵ ............................. H04N 9/88
[52] U.S. Cl. ............................ 358/314; 358/336; 360/38.1
[58] Field of Search .......... 358/310, 314, 336; 360/38.1

[56] References Cited

U.S. PATENT DOCUMENTS

| | | | |
|---|---|---|---|
| 4,467,368 | 8/1984 | Horstmann | 358/310 |
| 4,591,925 | 5/1986 | Trytko | 358/336 |
| 4,628,369 | 12/1986 | Ichinoi et al. | 358/314 |
| 4,689,695 | 8/1987 | Urata | 358/314 |
| 4,812,925 | 3/1989 | Opelt | 360/38.1 |
| 4,843,485 | 6/1989 | Reitmeier | 358/310 |

Primary Examiner—Roy N. Envall, Jr.
Assistant Examiner—Thai Tran

[57] ABSTRACT

A device for the compensation of a drop-out in a frequency-modulated video signal comprises an FM demodulator (4), a dropout detector (5), an A/D converter (6), and a code-word-insertion circuit (9). The code-word-insertion circuit (9) is constructed to insert a unique code-word instead of and at the location of a sample which is disturbed by a drop-out. After processing of the digitized video signal in a video-signal processing unit (12) the unique code-words are detected in a code-word detector (15) and compensation for these drop-outs is effected in a compensation unit (16).

20 Claims, 2 Drawing Sheets

DROP-OUT COMPENSATION CIRCUIT

BACKGROUND OF THE INVENTION

The invention relates to a device for the compensation of a drop-out in a video signal, comprising an input terminal for receiving a frequency-modulated video signal, which input terminal is coupled to inputs of an FM demodulator and a drop-out detector, an analog-to-digital converter having an input coupled to an output of the FM demodulator, and an output coupled to an input of a video-signal processing unit, which has an output coupled to an input of a digital-to-analog converter having an output coupled to an output terminal for supplying the drop-out-compensated video signal, and a compensation unit. Such a device can be used in a video recorder.

The publication "Wide band video signal recorder having level and linearity corrector" by T. Bannai et al in IEEE Trans. on CE, Vol. CE-32, No. 3 of August 1986, pages 268 to 273, describes a video recorder in which a frequency-modulated video signal is read from tracks on a record carrier, after which this signal is demodulated and applied to an analog-to-digital converter. The video signal thus digitized in applied to a video-signal processing unit, in which it is further processed. The video signal may be subjected, for example, to time compression or expansion, or to a time-base correction. Subsequently, the processed digital video signal is reconverted into an analog signal, after which it is suitable for reproduction on a TV screen.

SUMMARY OF THE INVENTION

It is the object of the invention to provide a drop-out compensation circuit which may be used, for example, in the known video recorder in order to compensate for drop-outs in a frequency-modulated video signal. To this end the device in accordance with the invention is characterized in that the drop-out detector is adapted to detect whether a sample of the video signal on the output of the analog-to-digital converter is disturbed by a drop-out and to subsequently supply a detection signal to a control-signal input of a code-word insertion circuit having an input coupled to the output of the analog-to-digital converter and having an output coupled to the input of the video-signal processing unit, in that the code-word-insertion circuit is adapted to insert a unique code-word in and at the location of a sample for which the code-word-insertion circuit has received a detection signal, in that the video-signal processing unit is adapted to supply a digital signal composed of successive video lines comprising a first signal block, with samples of a chrominance signal and a second signal block, with samples of a luminance signal, in that the output of the video-signal processing unit is coupled to an input of a code-word detector which is adapted to detect those samples in the digital video signal which correspond to the unique code-word and to subsequently supply a control signal to an output which is coupled to a first input of a compensation unit, which compensation unit further has a second input coupled to the output of the signal-processing unit, a third input for receiving information indicating to which signal block a sample belongs, and an output coupled to the digital-to-analog converter, and in that the compensation unit is adapted to replace a sample of a video line, if this is a sample of the second signal block of said video line, by a corresponding sample of a preceding video line, preferably the directly preceding video line under the influence of the signals applied to the first and the third input of said compensation unit.

The invention is base on the recognition of the following fact. Drop-outs in the frequency-modulated video signal can be detected in a comparatively simple manner.

In particular if the frequency-modulated video signal read from the record carrier is a MAC signal or a MUSE signal, it is very difficult to compensate for such a drop-out in the video signal obtained after signal processing in the video-signal processing unit, where the detection signal is used directly. This is because, for example, the time-base correction in the video-signal processing unit causes the digital video signal to be shifted in time, so that it is no longer possible to readily determine the exact position of the drop-out in the output signal of the signal-processing unit.

If prior to processing of the video signal the video-signal processing unit inserts a unique code-word in the digital video signal at the location of the drop-out, this code-word can be detected after processing in the video-signal processing unit, so that subsequent correction is possible.

Both for a MAC signal and for a MUSE signal a drop-out situated in a second signal block of a video line will constitute a drop-out in a sample of the luminance signal. Compensation for this drop-out is then possible by inserting the value of the corresponding sample of a preceding video line, for example the immediately preceding video line, at the location of the code word.

If a drop-out occurs in a sample in the first signal block another correction method is required.

Since in every two consecutive video lines of the MAC signal the U-component of the chrominance signal is stored in the first information block of one line and the V-component of the chrominance signal is stored in the first information block of the other line, a correct compensation is achieved by taking the value for the corresponding sample of the m-th exceeding video line, m being an even positive integer, preferably 2. A similar reasoning applies to the MUSE signal.

If the samples in the digital video signal are represented by n-bit digital numbers the unique code-word is a unique n-bit digital number, preferably the n-bit digital number comprising only "ones". Care must then be taken that the analog-to-digital converter does not supply any samples identical to said unique n-bit number.

It is to be noted that from the publication "Digital time base correction of video tape recorders" by M. L. Sanders in Monitor-Proc. IREE of April 1976, pages 118 to 122, it is known to provide every n-bit sample in the video signal with an additional bit to indicate whether a sample is disturbed by a drop-out.

This method has the disadvantage that it requires an additional bit and is therefore not an efficient way of indicating the presence of drop-outs. The word width has increased by 1/n.

In the device in accordance with the invention, in contrast with the known method, only those samples which are disturbed by drop-out are replaced by a unique code-word. Inserting the unique code requires only one of the $2^n$ possible codes; if $n=8$ the dynamic range becomes only 0.033 dB smaller.

The MAC signal and the MUSE signal also comprise third signal blocks in every video line. These third signal blocks contain other information such as data, synchronisation and audio signals.

If a drop-out occurs in a third signal block a compensation as described in the foregoing for the luminance and the chrominance signal will not provide a solution, given the type of information.

Therefore, should a drop-out occur in a third signal block such a drop-out is not compensated for by means of one of the above methods.

The device in accordance with the invention may be characterized further in that the code-word-insertion circuit is adapted to insert a first unique code-word in and at the location of a sample of the first signal block for which the code-word-insertion circuit has received a detection signal and is adapted to insert a second unique code-word in and at the location of a sample of the second signal block for which the code-word-insertion circuit has received a detection signal. In this way the code-word itself already indicates the type of information involved, namely chrominance information or luminance information.

The code-word detector may be adapted to detect those samples in the digital video signal which correspond to the first or the second unique code-word, the code-word detector having a second output for supplying information on whether the detected code-word is the first or the second unique code-word, and the second output of the code-word detector being coupled to the third input of the compensation unit. In this way it is possible to determine simply which correction is to be applied. It should be noted that DE-OS 3630179 discloses a drop-out compensation circuit in which a unique codeword is used to identify the location of the drop-outs in the video information. It however does not disclose a separate compensation for drop-outs in the chrominance part and for drop-outs in the luminance part in the video information.

BRIEF DESCRIPTION OF THE DRAWINGS

Some embodiments of the invention will now be described in more detail, by way of example, with reference to the accompanying drawings. In the drawings FIG. 1 shows an apparatus for reproducing a video signal from a record carrier, comprising the device for drop-out compensation, FIG. 2 shows the compensation unit in the device shown in FIG. 1, FIGS. 3a and 3b represent the track pattern of an HD-MAC signal on a magnetic record carrier, and FIG. 4 illustrates the method of compensation for a drop-out in an HD-MAC signal.

DETAILED DESCRIPTION OF THE INVENTION

FIG. 1 shows diagrammatically an apparatus for reproducing a video signal from tracks on a magnetic record carrier, in particular an apparatus for reading an HD-MAC signal from a magnetic record carrier. The manner in which such a signal can be recorded on a magnetic record carrier is illustrated in FIG. 3.

Figure 3A:
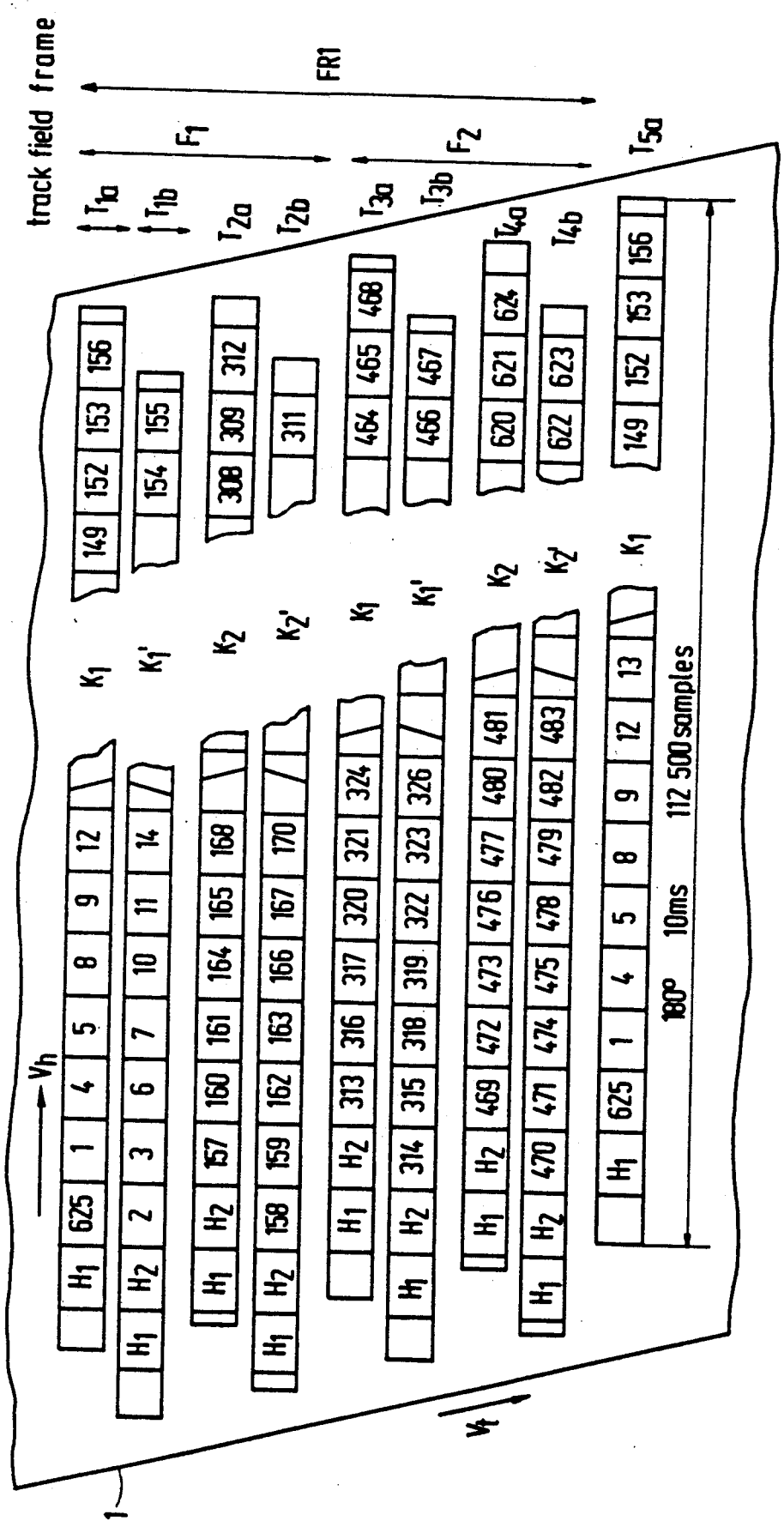
Figure 3B:
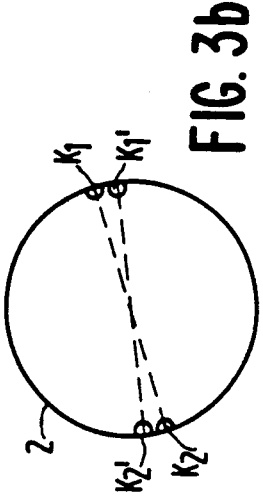
Figures 3A, 3B:
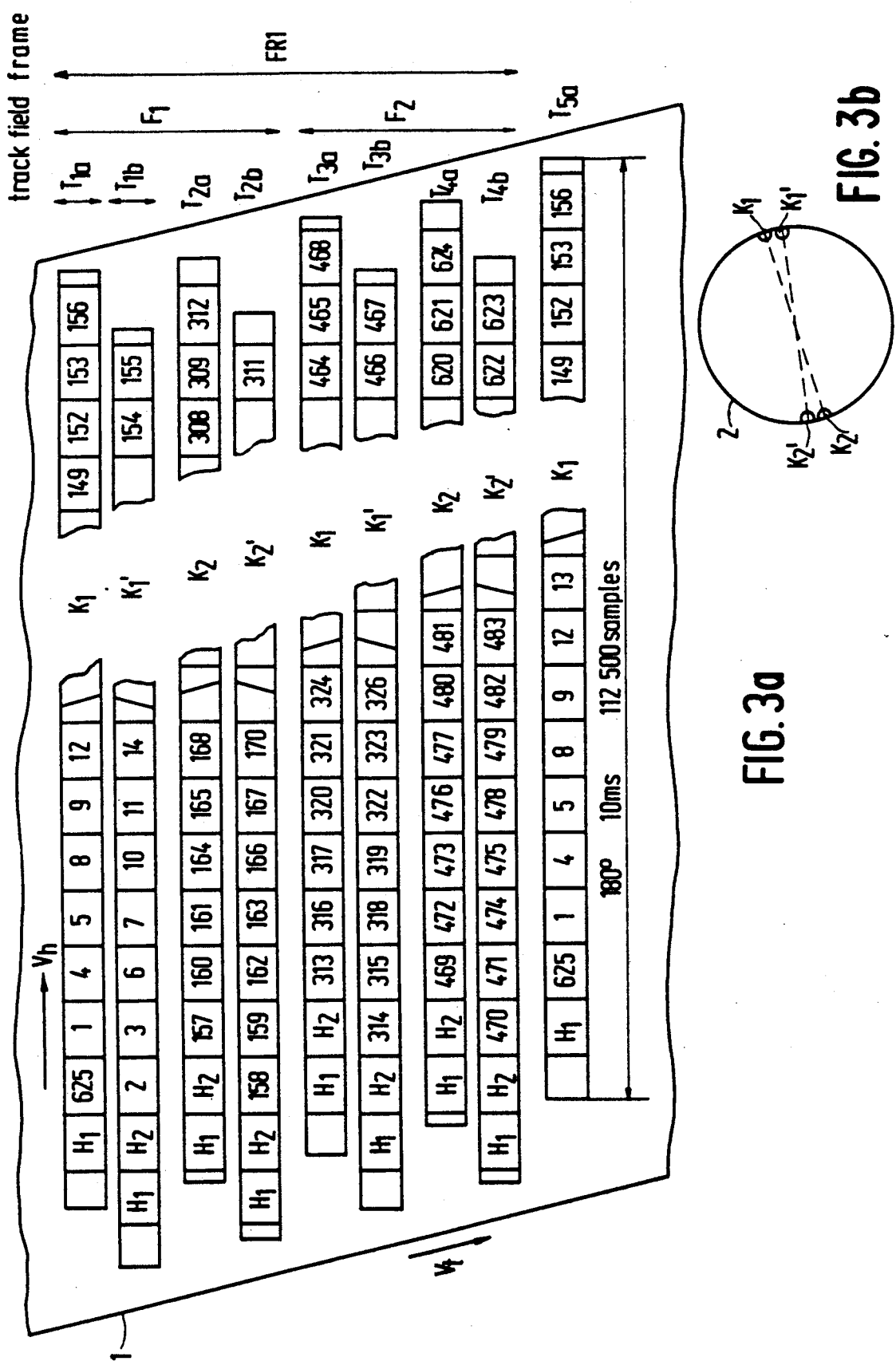

FIG. 3a shows a magnetic record carrier 1 with tracks $T_{1a}$, $T_{1b}$, $T_{2a}$, $T_{2b}$, $T_{3a}$, $T_{3b}$, $T_{4a}$, $T_{4b}$, ... etc. which are inclined relative to the longitudinal direction of the record carrier. As shown in FIG. 3b, these tracks are read by read means comprising four read heads $K_1$, $K_1'$, $K_2$ and $K_2'$ arranged on a rotatable head drum 2. The heads $K_1$ and $K_2$ have air gaps with a specific (identical) azimuth angle. The heads $K_1'$ and $K_2'$ have air gaps whose azimuth angle is opposite to the azimuth angle of the heads $K_1$ and $K_2$. The record carrier 1 is wrapped around the head drum 2 through 180°. The tracks $T_{1a}$ and $T_{1b}$ are read substantially concurrently by the heads $K_1$ and $K_1'$, which for this purpose are arranged close to one another at the periphery of the head drum 2. The tracks $T_{2a}$ and $T_{2b}$ are also read substantially concurrently by the heads $K_2$ and $K_2'$, which for this purpose are also arranged close to one another at the periphery of the head drum 2, namely diametrically opposite the heads $K_1$ and $K_1'$.

Subsequently the heads $K_1$ and $K_1'$ again read the tracks $T_{3a}$ and $T_{3b}$ substantially concurrently and after this the heads $K_2$ and $K_2'$ read the tracks $T_{4a}$ and $T_{4b}$. .. etc. A video frame comprising 625 video lines is recorded on the record carrier in 8 successive tracks $T_{1a}$ to $T_{4b}$. One frame, such as FR1 in FIG. 3a, consequently comprises 8 successive tracks. One frame comprises two fields. One field F1 consequently comprises the tracks $T_{1a}$ to $T_{2b}$. The other field F2 consequently comprises the tracks $T_{3a}$ to $T_{4b}$.

Each track comprises 80 line segments, namely the blocks indicated by reference numerals in the tracks and the blocks bearing the references H1 and H2 in the tracks. This means that one frame comprises a total of 640 lines. Except for the track $T_{1a}$, the tracks comprise 78 video lines, i.e. the blocks indicated by reference numerals. The track $T_{1a}$ (and the track $T_{5a}$) contain 79 video lines and only one auxiliary line H1. The auxiliary lines $H_1$ and $H_2$ contain information other than the video signal. The auxiliary lines can be used for channel compensation by inserting a pilot signal in these lines, as is described in the aforementioned IEEE publication by Bannai et al. It is also possible to utilise an auxiliary line in order to obtain a (higher) redundancy, enabling an (improved) error correction to be achieved during reproduction.

Each track further comprises blocks, not shown, at the beginning and at the end, within which blocks the head change from the head $K_1$ to the head $K_2$ and the head $K_1'$ to head $K_2'$ and vice versa should take place.

The direction of movement of the record carrier and of the read head over the record carrier is indicated by $V_t$ and $V_h$ respectively.

The numerals in the blocks in the tracks represent the line numbers in a video frame.

The record carrier can be read by means of the device shown in FIG. 1. The heads $K_1$, $K_1'$, $K_2$ and $K_2'$ are each coupled to a terminal of one of the two switches $S_1$ and $S_2$. At the instant at which the heads $K_1$ and $K_1'$ scan the tracks $T_{1a}$ and $T_{2a}$ the switches $S_1$ and $S_2$ are in their upper positions. When the tracks $T_{2a}$ and $T_{2b}$ are scanned by the read heads $K_2$, $K_2'$ the switches are in their lower positions. The output 3 of the switch $S_1$ is coupled to an input of an FM demodulator 4 and a drop-out detector 5. The heads read a frequency-modulated video signal from the record carrier, which signal is demodulated by the FM demodulator. This demodulated video signal is applied to an A/D converter 6 in which the video signal is sampled with a suitable sampling rate and is subsequently digitized to form a sequence of n-bit digital samples. The video signal thus digitized is applied to a code word insertion circuit 7.

The drop-out detector 5 detects whether drop-outs occur in the frequency-modulated video signal and produces a detection signal on its output 10 if a drop-out is detected. This detection signal is applied to a control-signal input 9 of the code-word-insertion circuit 7 via a delay element 8. The delay element 8 delays the detection signal by such a time interval T that an exact compensation is obtained for the delays produced in the digitized signal on the output of the A/D converter 6 as a result of the frequency demodulation and the A/D conversion. The detection signal applied to the control-signal input 9 now exactly indicates which sample in the digitized video signal is disturbed by a drop-out.

The code-word insertion circuit 7 is adapted to insert a unique code-word instead of and at the location of a sample for which the drop-out detector has supplied a detection signal. Such a unique code-word may be, for example, the n-bit digital number comprising only "ones".

This number should not occur as a sampled value in the digitized video signal. This can be achieved by operating the A/D converter in such a way that it never generates said unique code-word. However, alternatively the A/D converter 6 may generate these unique code-words. In that case the code-word-insertion circuit converts samples corresponding to the unique code-word into another sampled value. The circuit 7 transfers the other samples unmodified. Subsequently, the digitized video signal is applied to an input 11 of a video-signal processing unit 12.

The video signal read by the read heads $K_1'$ and $K_2'$ is applied to a circuit identical to the above circuit via the switch $S_2$. Therefore, the elements in this circuit bear the same reference numerals, but primed. The operation of the circuit comprising the elements 4' to 8' is also identical to that of the circuit comprising the elements 4 to 8. The output signal of the code-word-insertion circuit 7' is applied to a second input 13 of the video-signal processing unit 12.

The processing unit 12 is intended to arrange the video lines read by the read heads in the correct sequence. The line 1 read by the head $K_1$ comes first, followed by the lines 2 and 3 read by the head $K_1'$, then the lines 4 and 5 read by the head $K_1$ . . . etcetera. In addition, a time-base correction and a time compression or expansion may be applied to the video signal. Moreover, an error-correction method may be applied to the video signal. In this respect it is to be noted that the unique code-words should not be affected by the various operations in the processing unit 12.

The video signal thus processed is applied to the output 14. Successive lines on the output 14 will be as shown diagrammatically in FIG. 4. FIG. 4 shows three successive lines L1, L2 and L3. Each line comprises three signal blocks and a total of N samples.

A signal block A contains data, synchronisation signals and audio signals. A signal block B contains a chrominance signal and a signal block C contains a luminance signal Y.

In the MAC standard the signal block B of a specific video line, such as the line L1, contains the chrominance component $U = R - Y$ and the signal block B of a directly succeeding video line contains the other chrominance component $V = B - Y$. The signal block B of the next line L3 again contains the U-component etc.

For the correct formation of a line in the colour picture the video information of two successive video lines L1 and L2 is required. A subsequent line in the colour picture is composed of the lines L2 and L3.

The output 14 of the processing unit 12 is coupled to the inputs of a code-word detector 15 and a compensation unit 16. The code-word detector 15 is adapted to detect code-words in the digitized video signal appearing on the output 14 of the processing unit 12 and, after detection, to supply a control signal, which is applied to a control-signal input 17 of the compensation unit. The compensation unit 16 further has an input 18 to which information is applied which indicates to which of the three blocks A, B or C a sample applied to the input 19 belongs.

The operation of the compensation unit 16 will now be described with reference to FIG. 4.

A control signal received via the input 17 indicates that the sample instantaneously applied to the input 19 is disturbed by a drop-out. The signal applied to the input 18 indicates that it is a sample from block B.

The relevant sample is the sample 30 in line L3 shown in FIG. 4. This is a sample in the signal block B of the U-component of the chrominance signal of the video line L3. When it is assumed that the sample 30 is the i-th sample in the row of samples, this sample will be replaced by the (i-2N)-th sample. This sample bears the reference numeral 31 and is found to be the corresponding sample in the signal block B of the U component of the chrominance signal of the video line L1.

If the sample 32 in the signal block C of the video line L3 is found to be disturbed by a drop-out, this sample will be replaced by the corresponding sample in the signal block C of the directly preceding video line L2. This sample bears the numeral 33. When it is assumed that the sample 32 is the j-th sample in the row samples this sample will be replaced by the (j-N)-th sample.

FIG. 2 shows an example of a compensation unit 16. The unit 16 comprises a controllable three-position switch 35. The switch is controlled by the signals applied via the inputs 17 and 18.

If no code-word is detected because no control signal is applied to the input 17, the switch 35 will be in the lower position. The terminals 36 and 37 are then interconnected and the video signal applied to the input 19 is fed directly to the output 20.

The output signal is applied to the terminal 38 of the switch 35 via a delay element 40, which delays the output signal by N samples, and moreover it is applied to the terminal 39 of the switch 35 via a second delay element 41, which also provides a delay corresponding to N samples.

It is assumed that at the instant at which a sample of a luminance signal block C is applied to the input 19 a control signal is applied to the input 17. The sample on the input 18 indicates that it is a sample of a signal block C. The switch 35 is now briefly switched to the centre position, as a result of which the terminals 38 and 37 are interconnected. At this instant the relevant sample is replaced by the corresponding sample of signal block C of the directly preceding video line. Immediately after this the switch is reset to the lower position.

It is now assumed that at the instant at which the sample of a chrominance block B is applied to the input 19 a control signal is applied to the input 17. The signal on the input 18 indicates that it is a sample from a signal block B. The switch 35 is now briefly changed over to the upper position, so that the terminals 39 and 37 are interconnected. At this instant the relevant sample is replaced by the corresponding sample of the signal block B of the second video line preceding the relevant video line. Immediately after this the switch is reset to the lower position. If the sample is a sample of a data block A, this sample, which is disturbed by a drop-out, is transferred unmodified.

The information about the signal block in which a sample disturbed by a drop-out is situated can be derived in various ways. One possibility is to determine the type of sample directly from the output signal of the processing unit 12. Another possibility is to determine in the drop-out detector 5, 5' whether the drop-out occurs during a chrominance sample or a luminance sample. Depending on this, the drop-out detector 5, 5' can supply a first or a second control signal to the code word insertion circuit 7, 7'. Depending on whether the circuit 7, 7' receives a first or a second control signal the circuit 7, 7' will then insert a first unique code-word or a second unique code-word instead of and at the location of the disturbed sample. If the first unique code-word is, for example, an n-bit digital number comprising only "ones", the second unique code-word may be the n-bit digital number in which all the bits except for the least significant bit are "ones". The code-word detector 15 must then be adapted to the detect the first and the second unique code-words. This code-word detector 15 can then supply the relevant information about the signal block in which the dropout is situated to the input 18 of the compensation unit 16. For this purpose the detector 15 comprises a second output which is coupled to the input 18 of the compensation unit 16, as is indicated by a broken line in FIG. 1.

It is to be noted that the invention is not limited to the embodiments shown herein. The invention also relates to those embodiments which differ from the examples shown in respects which are not relevant to the present invention. For example, it is possible to provide compensation for a disturbance in a luminance sample in a signal block C by replacing this sample by the corresponding sample from another line than the line L2, for example the line L1.

Compensation for a disturbance in a chrominance sample can also be effected differently, for example by utilising, instead of the corresponding chrominance sample from the line L1, the corresponding chrominance sample from the second line preceding the line L1.

Moreover, the device in accordance with the invention need not necessarily be employed to read a video signal from a magnetic record carrier. The device can also be used for reading, for example, an optical record carrier. Moreover, the video signal need not necessarily be an HD-MAC signal. Other MAC signals can also be processed in the manner described above. In addition, the video signal may be MUSE signal.

I claim:

1. A device for compensating the occurrence of dropout in a video signal, the device comprising an input terminal for receiving a frequency-modulated video signal, which input terminal provides the frequency-modulated video signal to inputs of an FM demodulator having an output and a drop-out detector, an analog-to-digital converter responsive to the output of the FM demodulator, and a video-signal processing unit, responsive to the output of the FM demodulator, the video-signal processing unit having an output, a digital-to-analog converter having an input responsive to the output of the video-signal processing unit and having an output coupled to an output terminal for supplying a drop-out-compensated video signal, and a compensation unit, characterized in that the drop-out detector is adapted to detect whether a sample of the video signal on the output of the analog-to-digital converter is disturbed by a drop-out and to subsequently supply a detection signal to a control-signal input of a code-word insertion circuit, the code-word insertion circuit has an input for receiving the output of the analog-to-digital converter and has an output coupled to the input of the video-signal processing unit, in that the code-word insertion circuit is adapted to insert a unique code-word in and at the location of a sample for which the code-word-insertion circuit has received a detection signal, in that the video-signal processing unit is adapted to supply a digital signal composed of successive video lines comprising a first signal block, with samples of a chrominance signal, and a second signal block, with samples of a luminance signal, in that the output of the video-signal processing unit provides an input of a code-word detector which is adapted to detect those samples in the digital video signal which correspond to the unique code-word and to subsequently supply a control signal to an output which is coupled to a first input of a compensation unit, which compensation unit further has a second input coupled to the output of the signal-processing unit, which compensation unit further has a third input for receiving information from a source indicative of which signal block a sample applied to the compensation unit belongs, and an output coupled to the digital-to-analog converter, and in that the compensation unit is adapted to replace a sample of a video line, if this is a sample of the second signal block of said video line, by a corresponding sample of a preceding video line, preferably the directly preceding video line under the influence of the signals applied to the first and the third input of said compensation unit.

2. A device as claimed in claim 1, wherein the compensation unit is further adapted to replace a sample of said video line, if this is a sample of the first signal block of said video line, by a corresponding sample of the m-th video line preceding said line under the influence of the signals applied to the first and the third input of said compensation unit, m being even and positive and being preferably 2.

3. A device as claimed in claim 1, in which the samples in the digital video signal are represented by n-bit digital numbers, wherein the unique code-word is a unique n-bit digital number, preferably the n-bit digital number comprising only logic "ones".

4. A device as claimed in claim 1, wherein the code-word-insertion circuit is adapted to insert a first unique code-word in and at the location of a sample of the first signal block for which the code-word-insertion circuit has received a detection signal and is adapted to insert a second unique code-word in and at the location of a sample of the second signal block for which the code-word-insertion circuit has received a detection signal.

5. A device as claimed in claim 4, wherein the code-word detector is adapted to detect those samples in the digital video signal which correspond to the first or the second unique code-word, in that the code-word detector has a second output for supplying information on whether the detected code-word is the first or the second unique code-word, and in that the second output of the code-word detector is coupled to the third input of the compensation unit.

6. A device as claimed in claim 1, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

7. A device as claimed in claim 2, in which the samples in the digital video signal are represented by n-bit digital numbers, wherein the unique code-word is a unique n-bit digital number, preferably the n-bit digital number comprising only logic "ones".

8. A device as claimed in claim 2, wherein the code-word-insertion circuit is adapted to insert a first unique code-word in and at the location of a sample of the first signal block for which the code-word-insertion circuit has received a detection signal and is adapted to insert a second unique code-word in and at the location of a sample of the second signal block for which the code-word-insertion circuit has received a detection signal.

9. A device as claimed in claim 3, wherein the code-word-insertion circuit is adapted to insert a first unique code-word in and at the location of a sample of the first signal block for which the code-word-insertion circuit has received a detection signal and is adapted to insert a second unique code-word in and at the location of a sample of the second signal block for which the code-word-insertion circuit has received a detection signal.

10. A device as claimed in claim 8, wherein the code-word detector is adapted to detect those samples in the digital video signal which correspond to the first or the second unique code-word, in that the code-word detector has a second output for supplying information on whether the detected code-word is the first or the second unique code-word, and in that the second output of the code-word detector is coupled to the third input of the compensation unit.

11. A device as claimed in claim 9, wherein the code-word detector is adapted to detect those samples in the digital video signal which corresponds to the first or the second unique code-word, in that the code-word detector has a second output for supplying information on whether the detected code-word is the first or the second unique code-word, and in that the second output of the code-word detector is coupled to the third input of the compensation unit.

12. A device as claimed in claim 2, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

13. A device as claimed in claim 3, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

14. A device as claimed in claim 4, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

15. A device as claimed in claim 5, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

16. A device as claimed in claim 7, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

17. A device as claimed in claim 8, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

18. A device as claimed in claim 9, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

19. A device as claimed in claim 10, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

20. A device as claimed in claim 11, wherein the device is arranged in a video recorder for demodulating, after read-out of a record carrier, a video signal which has been recorded on the record carrier in frequency-modulated form, in that for this purpose the device further comprises read means including two or more read heads arranged on a rotatable head drum and an output coupled to the input of the FM demodulator.

* * * * *